United States Patent
Sai et al.

(10) Patent No.: US 10,862,704 B2
(45) Date of Patent: Dec. 8, 2020

(54) TIME-BASED SECURE ACCESS CONTROL SYSTEM

(71) Applicant: NXP USA, INC., Austin, TX (US)

(72) Inventors: Bin Sai, Tianjin (CN); Shixiong Lu, Tianjin (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/438,402

(22) Filed: Jun. 11, 2019

(65) Prior Publication Data
US 2020/0287742 A1    Sep. 10, 2020

(30) Foreign Application Priority Data
Mar. 7, 2019    (CN) .......................... 2019 1 0173748

(51) Int. Cl.
| | |
|---|---|
| *H04L 12/403* | (2006.01) |
| *H04L 12/40* | (2006.01) |
| *G06F 15/78* | (2006.01) |

(52) U.S. Cl.
CPC ........ *H04L 12/403* (2013.01); *G06F 15/7807* (2013.01); *H04L 12/40019* (2013.01)

(58) Field of Classification Search
CPC .. G06F 13/1605; G06F 13/3625; G06F 13/42; G06F 13/14; G06F 13/364
See application file for complete search history.

(56) References Cited

U.S. PATENT DOCUMENTS

| | | | |
|---|---|---|---|
| 6,130,621 | A | 10/2000 | Weiss |
| 7,372,861 | B2 | 5/2008 | Tomizawa |
| 7,757,295 | B1 | 7/2010 | Hadaaegh |
| 9,317,708 | B2 | 4/2016 | Lee et al. |
| 9,436,844 | B2 | 9/2016 | Love et al. |
| 2011/0225651 | A1* | 9/2011 | Villasenor ............... G06F 21/85 726/22 |

* cited by examiner

*Primary Examiner* — Idriss N Alrobaye
*Assistant Examiner* — Ronald T Modo

(57) ABSTRACT

In a System on a Chip (SOC) having multiple masters and multiple slaves connected to a bus via a crossbar switch, a time-based secure access control system of the SOC includes a central access control (CAC) circuit coupled to the master devices through respective channels to receive time-based access requests from the masters. Each slave is connected to a slave access control (SAC) circuit and each SAC circuit includes an access time control (ATC) circuit in communication with the CAC circuit and a dedicated timer. The CAC circuit controls the ATC circuits to limit the access permission from the masters to the slaves by checking whether a requested access time has expired.

16 Claims, 4 Drawing Sheets

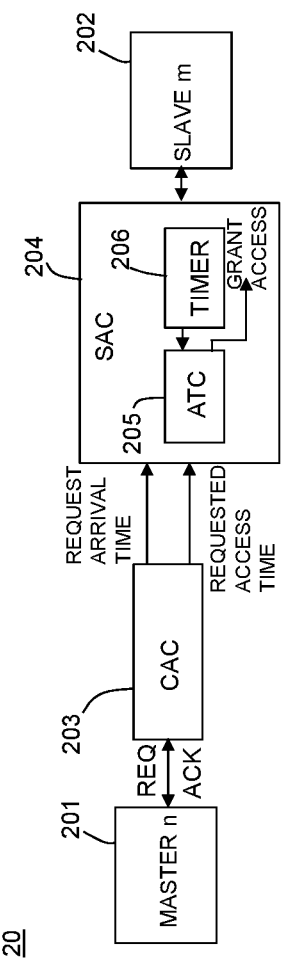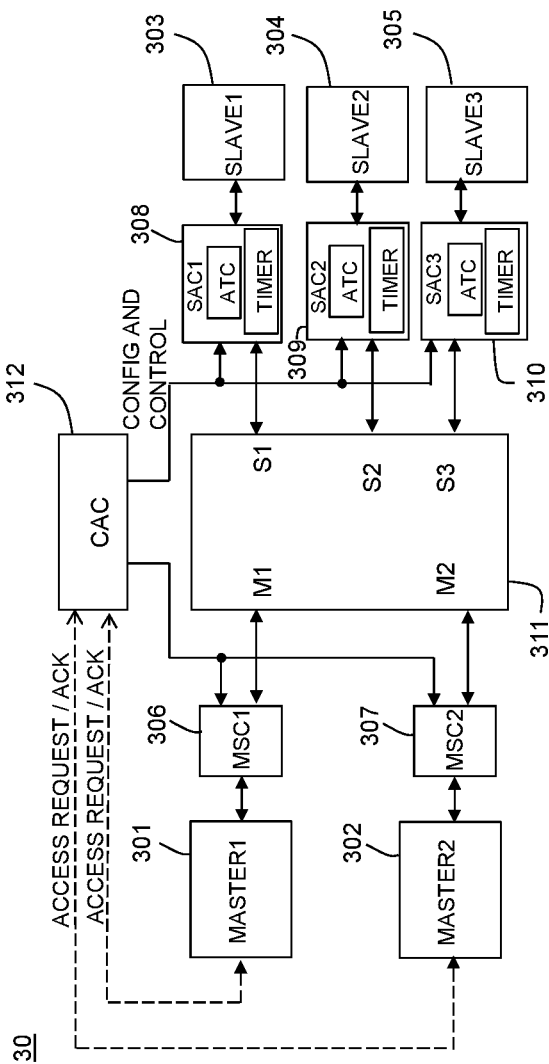

TIME-BASED SECURE ACCESS CONTROL SYSTEM

BACKGROUND

The present invention relates to system on chip (SOC) technologies, and, more particularly, to a time-based secure access control system in a SOC.

Many SOCs have multiple masters and multiple slaves. Traditionally, static access control methods are used to manage access permission to a slave by a master. FIG. 1 shows a conventional static access control system 10, which may be implemented in a SOC. The system 10 includes two master devices (Master1, Master2) 101 and 102, three slave devices (Slave1, Slave2, Slave3) 103-105, two master secure control (MSC) circuits (MSC1, MSC2) 106 and 107, three slave access control (SAC) circuits (SAC1, SAC2, SAC3) 108-110, a crossbar 111 and a central access control (CAC) circuit 112.

The master devices 101 and 102 are connected to the crossbar 111 through respective MSC circuits 106 and 107 and the slave devices 103-105 are connected to the crossbar 111 through respective SAC circuits 108-110. The CAC circuit 112 configures and controls the MSC circuits 106 and 107 and the SAC circuits 108-110 using a predetermined security policy of the SOC.

The MSC circuits 106 and 107 assign security properties to each bus transaction according to the predetermined security policy. The assigned security properties of each transaction are transmitted along with the bus signals, via the crossbar 111, to the bus interface of the SAC circuits 108-110 connected to the target slave device 103-105. The SAC circuits 108-110 will allow or forbid the transactions to the target slave devices 103-105 based on the security properties of the transactions.

However, the conventional static access control system 10 doesn't have a mechanism for dynamically limiting the allowed access time of each master, which allows a potential attacker a long time to try to access a slave device. If the slave device is a secure memory, then it could cause a leak of protected data.

Thus, it would be desirable to have a more secure access control system in a SOC.

SUMMARY

This summary is provided to introduce a selection of concepts in a simplified form that are further described below in the Detailed Description. This summary is not intended to be relied on to identify key features or essential features of the claimed subject matter, nor is it intended to be used to limit the scope of the claimed subject matter.

In one embodiment, the present invention provides a time-based secure access control system. The system comprises a plurality of slave devices, a plurality of master devices configured to generate time-based access requests to the slave devices, where the time-based access requests include a requested access time for accessing the respective slave device, a master device identification (ID) and a slave device ID. A central access control (CAC) circuit is coupled to the master devices and receives the time-based access requests and sends acknowledgements of the requests back to the master devices. There are a plurality of slave access control (SAC) circuits connected to respective ones of the slave devices and to the CAC circuit. Each SAC circuit includes an access time control (ATC) circuit and a dedicated timer. The ATC circuits and the timers are used to determine whether a requested time-based access has timed out and if an access request has timed out, then access to the slave device by the master device is denied.

In another embodiment, the present invention provides a method of controlling a time-based secure access control system including a plurality of slave devices, a plurality of master devices, and a central access control (CAC) circuit, where each of the slave devices includes an access time control (ATC) circuit. The method comprises the master devices generating time-based access requests including requested access times for accessing the respective slave devices and controlling the ATC circuits to limit access permission to the slave devices by checking whether the requested access time has expired.

BRIEF DESCRIPTION OF THE DRAWINGS

So that the manner in which the above recited features of the present application can be understood in detail, a more particular description of the application, briefly summarized above, can be had by reference to embodiments, some of which are illustrated in the appended drawings. It is to be noted, however, that the appended drawings illustrate only typical embodiments of this application and are therefore not to be considered limiting of its scope, for the application can admit to other equally effective embodiments. The drawings are for facilitating an understanding of the application and thus are not necessarily drawn to scale. Advantages of the subject matter claimed will become apparent to those skilled in the art upon reading this description in conjunction with the accompanying drawings, in which like reference numerals have been used to designate like elements, and in which:

FIG. 2 is a schematic block diagram of a dynamic access control system in accordance with one embodiment of the present invention;

FIG. 3 is a schematic block diagram of a SOC employing the dynamic access control system of FIG. 2, in accordance with one embodiment of the present invention;

DETAILED DESCRIPTION

Figure 1:
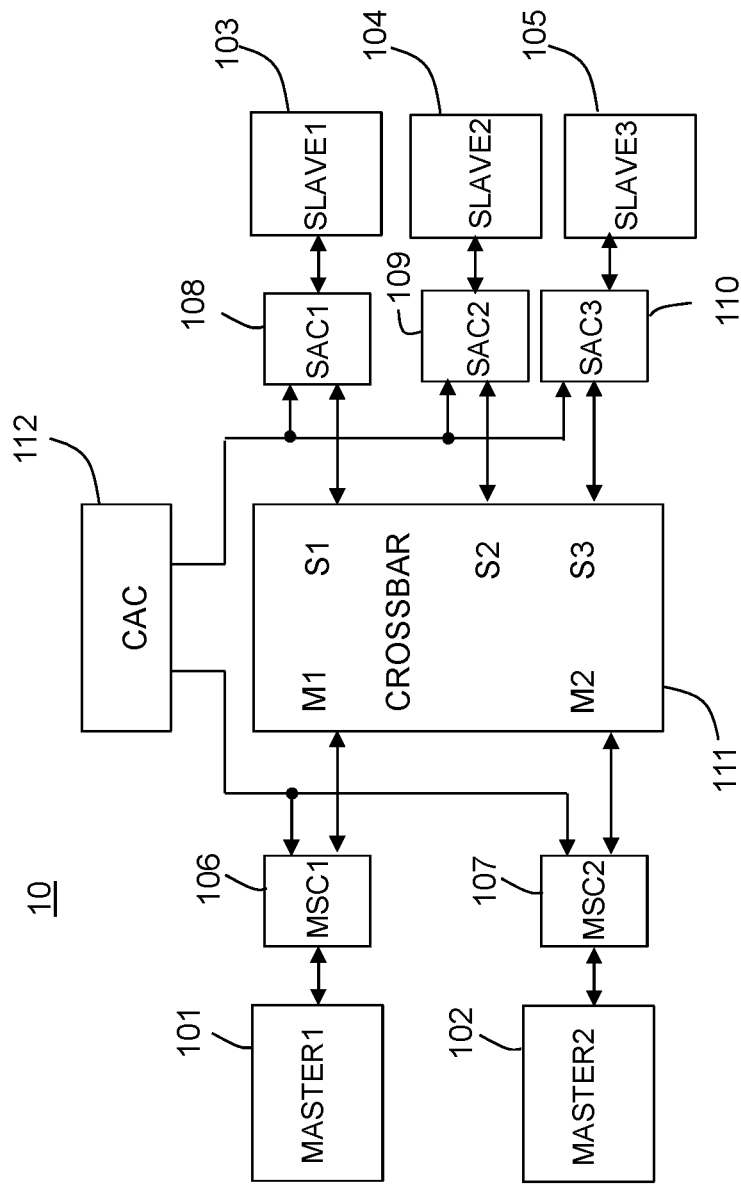
FIG. 1 is a schematic block diagram of a SOC having a conventional static access control system.

Referring to FIG. 2, a schematic diagram of a time-based dynamic access control system 20 according to an exemplary embodiment of the invention is shown. The system 20 can be part of a system on chip (SOC) in which various semiconductor components are integrated onto a single chip.

The system 20 includes at least one master device 201, at least one slave device 202, a central access control (CAC) circuit 203, and at least one slave access control (SAC) circuit 204. The SAC circuit 204 includes an access time control (ATC) circuit 205 and a dedicated timer 206. The SAC circuit 204 is configured to allow or prevent transactions to the slave device 202 according to security properties of the transactions and a configured security policy.

When the master 201 wants to access the slave 202, the master 201 first sends a time-based access request to the CAC circuit 203. The time-based access request includes the slave identification (ID) and a requested access time. The requested access time means the time span requested for the transactions from the master n 201 to the slave m 202. In one embodiment, the access request also includes the master ID.

When the CAC circuit 203 receives a time-based access request from the master 201, the CAC circuit 203 uses conventional circuitry to check a security state of SOC before triggering the ATC circuit 205 of the SAC circuit 204. In the presently preferred embodiment, if the SOC is in a secure state, then the CAC circuit 203 sends an ACK signal to the master 201, and if the SOC is not in a secure state, then the CAC circuit 203 will send a NACK signal to the master 201. The NACK signal indicates to the master 201 that it cannot at present access the slave 202.

Further, if the SOC is in the secure state, the CAC 203 will trigger the ATC circuit 205 of the SAC circuit 204 associated with the slave 202 to record the arrival time of the access request (M_n_arrive_time) and the requested access time (M_n_requested_time). The CAC circuit 203 also triggers the ATC circuit 205 to generate a granted time slot for the master 201 to access the slave 202, where the granted time slot is the requested access time.

In the presently preferred embodiment, the timer 206 is a real-time timer. The access request arrive time and the requested access time from the master 201 can be received by the timer 206 as described below.

The ATC circuit 205 continuously checks to determine whether the time generated by the timer 206 is less than a sum of the time of M_n_arrive_time and M_n_requested_time. When the time generated by the timer 206 is less than a sum of the access request arrival time (M_n_arrive_time) and the requested access time (M_n_requested_time), then the ATC circuit 205 generates a grant access signal, which is used to permit the master 201 to access the slave 202. In one embodiment, the SAC circuit 204 also can check if the transactions from the master 201 meet the static security strategy within the granted time slot. The SAC circuit 204 allows the transactions from master 201 to the slave 202 when the time generated by the timer 206 is within the sum of the time of M_n_arrive_time and M_n_requested_time and the transactions from the master n 201 meet the static security strategy within the granted time slot. When the time generated by the timer 206 exceeds the sum of the M_n_arrive_time and M_n_requested_time, the SAC circuit 204 prevents transactions from the master 201 to the slave 202. In this way, the SAC circuit 204 can dynamically limit the allowed access time.

FIG. 3 is a schematic block diagram of a SOC 30 with both static and dynamic access control systems according to an exemplary embodiment of the invention. The components of the static access control circuit are similar to the components shown in FIG. 1, and thus are not described again.

The system 30 includes a plurality of master devices, two of which are shown (Master1 301 and Master2 302), and a plurality of slave devices, three of which are shown (Slave1 303, Slave2 304, Slave3 305). The master devices 301 and 302 each has an associated master secure control (MSC) circuit (MSC1 306 and MSC2 307, respectively, and the slave devices each has an associated slave access control (SAC) circuit (SAC1 308, SAC2 309, and SAC3 310, respectively). There is a crossbar 311 that connects the master devices to the slave devices, and a central access control (CAC) circuit 312. Each SAC circuit 308-310 includes an access time control (ATC) circuit 316-318 and a dedicated timer 313-315. While FIG. 3 shows two master devices and three slave devices, this is just one example, as the inventive concept is not limited to any particular number of master devices or slave devices.

The master devices 301, 302 are connected to the crossbar 311 by way of respective ones of the MSC circuits 306 and 307 and the slave devices 303, 304, 305 are connected to the crossbar 311 by way of respective ones of the SAC circuits 308, 309 and 310. The CAC circuit 312 configures and controls the MSC circuits 306 and 307 and the SAC circuits 308-310 according to a security policy of the system 30.

When a master device wants to access a slave device, the master devices sends a time-based access request to the CAC circuit 312. The CAC circuit 312 controls the ATC circuits 316-318 to limit the allowed access time of the master device to the slave device. The CAC 312 communicates with the MSC circuit so that the static security state of the SOC is checked, as is known in conventional systems. However, according to the present invention, the CAC 312 also communicates with the respective SAC circuits 308-310 to conduct a dynamic, time-based security check, which only allows a master device to perform transactions with a slave device for a limited period of time.

More particularly, the SAC circuit 308, 309 or 310 associated with the slave device of which access is requested, records the access request arrival time and the requested access time and then continuously checks whether the time generated by the timer is less than a sum of the access request arrival time and the requested access time. The SAC circuit 308, 309 or 310 allows or prevents a transaction from the master device to the slave device according to the checking result of the ATC circuit.

When the time generated by the timer 313, 314 or 315 is less than the sum of the access request arrival time and the requested access time (M_n_arrive_time+M_n_requested_time), then the SAC circuit will permit access to the slave device by the master device. On the other hand, the SAC circuit will prevent transactions from the master device to the slave device if the dynamic security is not met. That is, the CAC circuit 312 controls the ATC circuits 316, 317 and 318 to limit access permissions of the master devices 301, 302 to the slave devices 303, 304, 305 by checking whether the requested access time has expired.

In the presently preferred embodiment, each master device of the plurality of master devices 301, 302 is coupled to a respective one of the MSC circuits 306 and 307. The MSC circuits 306 and 307 assign respective properties to each bus transaction according to the static security policies of the SOC for the respective master devices. The assigned properties are transmitted along with bus signals to the crossbar 311 and then to the SAC circuits 308, 309 and 310. The SAC circuits 308, 309 and 310 allow transactions from the master devices 301, 302 to the slave devices 303-305 if the time generated by the timers 303-315 is less than the sum of the access request arrival time and the requested access time and the transactions meet the static security policies of the SOC. On the other hand, the SAC circuits 308, 309 and 310 prevent transactions from the master devices 301, 302 to a selected one of the slave devices 304-306 if the time generated by the respective timer 303-315 exceeds the sum of the access request arrival time and the requested access time or the transactions do not meet the static secure policies of the SOC.

Figure 4:
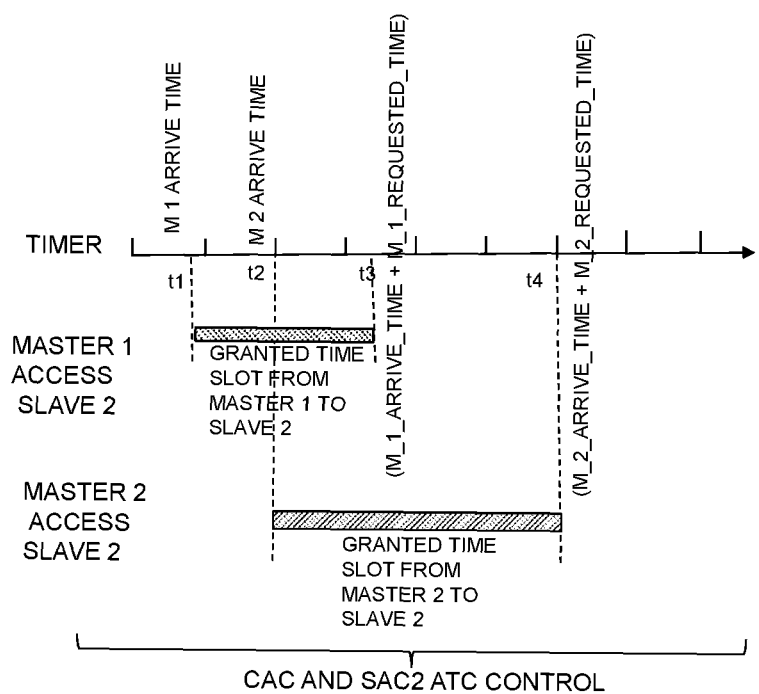
FIG. 4 is a timing diagram of two master devices attempting to access the same slave device in accordance with one embodiment of the present invention.

FIG. 4 is a timing diagram illustrating when two master devices request access to the same slave device in accordance with an embodiment of the invention.

Referring to FIG. 4, master 1 and master 2 request to access the same slave 2 at different times. Times t1 and t3 represent the access arrival times M_1_arrive_time and a sum of the access arrival time (M_1_arrive_time) and the requested access time (M_1_requested_time) for master 1.

The granted time slot for master 1 to access slave 2 is the time span from t1 to t3. Times t2 and t4 represent the access arrival time (M_2_arrive_time) and a sum of the access arrival time (M_2_arrive_time) and the requested access time (M_2_requested_time) for master 2. The granted time slot for master 2 to access slave 2 is the time span from t2 to t4.

For the master 1, the ATC circuit checks whether the time generated by the timer has reached the sum of M_1_arrive_time and M_1_requested_time. For the master 2, the associated ATC circuit checks whether the time output from its timer has reached the sum of M_2_arrive_time and M_2_requested_time. For example, regarding master 1, when the time generated by the timer is less than a sum of (M_1_arrive_time+M_1_requested_time) and the transactions meet the static security policies, then the SAC circuit will generate a grant access signal. The grant access signal permits access to the slave 2 by the master 1. When the time generated by the timer exceeds the sum of (M_1_arrive_time+M_1_requested_time), the SAC circuit will prevent master 1 transactions to slave 2. Similarly, regarding master 2, when the time generated by the timer is less than a sum of (M_2_arrive_time+M_2_requested_time) and the transactions meet the static security policies, the ATC circuit will generate a grant access signal for master 2 to access slave 2. When the time generated by the timer exceeds the sum of (M_2_arrive_time+M_2_requested_time), the SAC circuit prevents any of the transactions from master 2 to slave 2. Note that both master 1 and master 2 are allowed to access slave 2 at the same time because one ATC can have several channels to handle different masters. Moreover, since the ATC timer is a real-time timer, then the output of the timer can be compared against the respective sums for the master 1 request and the master 2 request.

Figure 5:
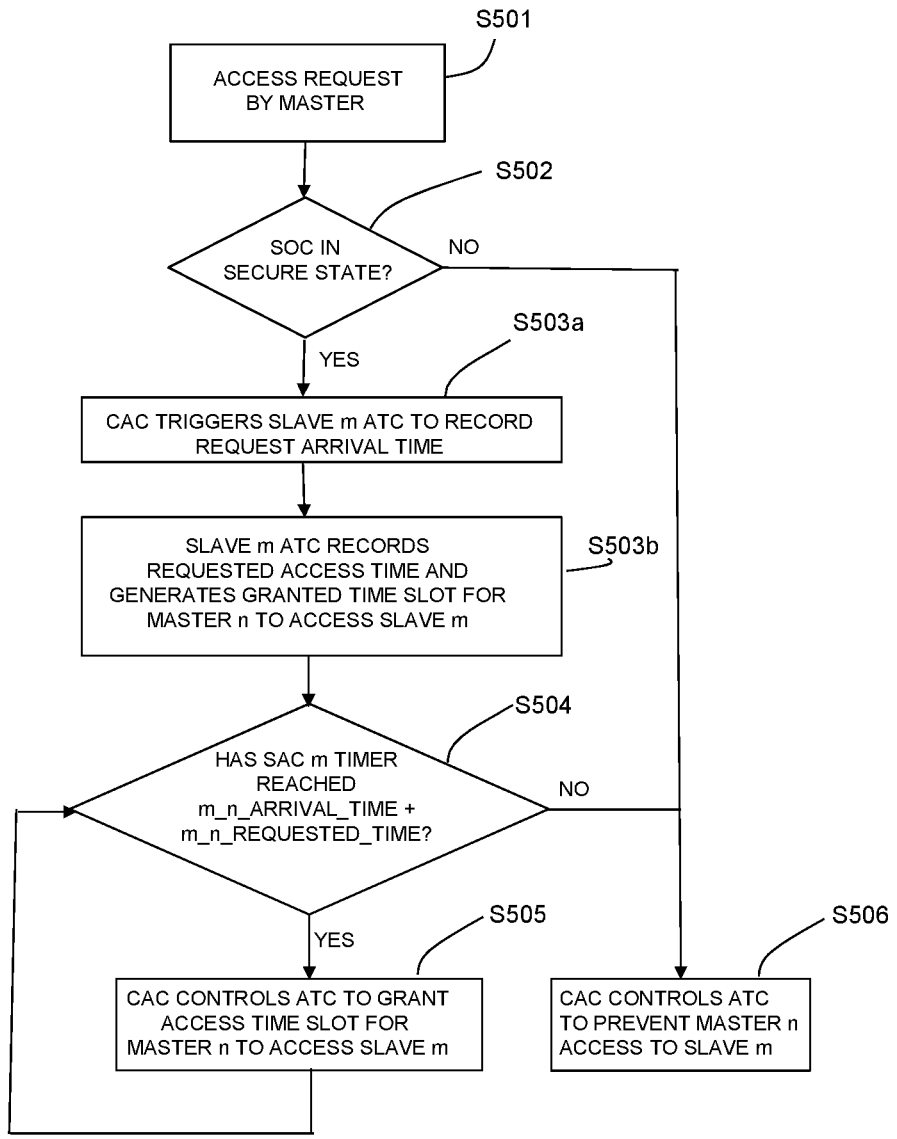
FIG. 5 is a flow chart illustrating a time-based dynamic access control method in accordance with an embodiment of the present invention.

FIG. 5 is a flow chart illustrating a time-based dynamic access control method in accordance with an embodiment of the invention.

At step S501, the CAC circuit receives an access request from master n to slave m. At step S502, in the presently preferred embodiment, the CAC circuit, in conjunction with the respective MSC circuit, checks if the SOC is in a secure state. If the SOC is not in a secure state, the SAC circuit forbids master n from accessing slave m by sending a NACK to master n. If the SOC is in a secure state, then at step 503*a*, the CAC circuit sends an ACK to master n and triggers the SAC circuit associated with slave m to record the time when the request from master n arrives (M_n_arrive_time) and the requested access time (M_n_requested_time). At step S503*b*, the ATC of the associated SAC records the times M_n_arrive_time and M_n_requested_time. At step S504, the SAC circuit checks whether the time output by the timer exceeds a sum of M_n_arrive_time and M_n_requested_time. At step S505, if no, then the ATC circuit grants the access time slot to master n to access slave m. At step S506, if yes, then the SAC circuit prevents master n from accessing slave m.

Thus, the present invention provides a time-based dynamic access control system, which introduces an access time control unit in front of each slave to limit the access permission from the master devices to the slave devices based on the requested access time from the master devices dynamically.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the application as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A time-based secure access control system, comprising:
a plurality of slave devices, each slave device having a slave device identification (ID);
a plurality of master devices, each master device having a master device ID, wherein each master device is configured to generate time-based access requests, each time-based access request including a slave device ID and requested access time for accessing a selected one of the slave devices;
a central access control (CAC) circuit in communication with each of the master devices, wherein the CAC circuit receives the time-based access requests from the master devices; and
a plurality of slave access control (SAC) circuits, wherein each of the SAC circuits is coupled to a respective one of the slave devices, wherein each SAC circuit includes a dedicated timer and an access time control (ATC) circuit, and wherein each SAC circuit is in communication with the CAC circuit,
wherein when a master device sends a time-based access request to access a selected one of the slave devices to the CAC circuit, the CAC circuit controls the ATC circuit of the selected slave device to limit an access permission of the master device to the selected slave device by checking whether the requested access time has expired.

2. The system of claim 1, wherein the time-based access requests further include the master device ID.

3. The system of claim 1, wherein the ATC circuits are triggered by the CAC circuit, and the ATC circuits record an access request arrival time and the requested access time.

4. The system of claim 3, wherein the system is in a System on a Chip (SOC) and the CAC circuit checks a security state of the SOC before triggering the ATC circuits.

5. The system of claim 4, wherein if the SOC is not in a secure state, then the CAC circuit sends a NACK to the master device, wherein the NACK indicates that the master device cannot access the selected slave device.

6. The system of claim 3, wherein if the SOC is in a secure state, then the CAC circuit sends an ACK to the master device, wherein the ACK indicates that the requested access at the requested access time is granted.

7. The system of claim 6, wherein the ATC circuit generates a grant access signal when a time generated by the timer is less than a sum of the access request arrival time and the requested access time, wherein the grant access signal permits access to the slave device by the master device.

8. The system of claim 7, wherein the SAC circuits prevent access to the respective slave devices if the time generated by the timer exceeds the sum of the access request arrival time and the requested access time.

9. The system of claim 8, wherein the dedicated timer acts as a real-time timer and the ATC circuit continuously checks if the requested access time has expired.

10. The system of claim 1, wherein the plurality of master devices includes a first master device and a second master device, wherein both the first and second master devices request access to the same slave device at different times.

11. The system of claim 10, wherein the first master device has a first access request arrival time and a first requested access time and the second master device has a second access request arrival time and a second requested access time, and the ATC circuit of the requested slave device permits a granted time slot for the first master device access to the slave device if the time generated by the timer is within a sum of the first access request arrival time and the first requested access time, and the ATC circuit permits another granted time slot for the second master device access to the slave device if the time generated by the timer is within a sum of the second access request arrival time and the second requested access time.

12. In a System on a Chip (SOC) having a plurality of master devices and a plurality of slave devices, wherein the master devices are in communication with the slave devices by way of a crossbar switch, a time-based access control system, comprising:
   a Central Access Control (CAC) circuit in communication with the plurality of master devices, wherein the CAC circuit manages requests for access to the slave devices by the master devices, and wherein when the CAC circuit receives an access request from a master device, the CAC circuit provides an acknowledgement of said access request back to the master device;
   a plurality of slave access control (SAC) circuits corresponding to the plurality of slave devices, wherein each slave device is coupled to a respective one of the SAC circuits, wherein each SAC circuit includes a dedicated timer and an access time control (ATC) circuit, and wherein each SAC circuit is in communication with the CAC circuit,
   wherein (i) a master device makes a time-based request for access to a slave device by issuing a time-based access request including a master device identification (ID), a slave device ID, and a requested access time, (ii) the CAC circuit receives the time-based access request and triggers the ATC circuit of the SAC circuit associated with the slave device identified by the slave device ID of the time-based access request to record an access request arrival time and the requested access time and to check whether a time generated by the dedicated timer of the ATC circuit slave device is less than a sum of the access request arrival time and the requested access time, and (iii) the SAC circuit allows or prevents transactions from the master device to the selected slave device based on the time check performed by the ATC circuit,
   wherein the CAC circuit controls the ATC circuits to limit access permissions of the master devices to the slave devices by checking whether the requested access time has expired.

13. The SOC of claim 12, further comprising:
   a plurality of Master Secure Control (MSC) circuits corresponding to the plurality of master devices, wherein each master device of the plurality of master devices is coupled to a respective one of the MSC circuits, and wherein the MSC circuits assign respective static security properties to each transaction from the respective master devices according to the static security policies of the SOC for the respective master devices, wherein the assigned properties are transmitted to the SAC circuits by way of the crossbar switch.

14. A method of controlling access to a slave device by a master device in a time-based secure access control system, wherein the system includes a central access control (CAC) circuit and a slave access control (SAC) circuit, wherein the SAC circuit includes an access time control (ATC) circuit and a dedicated timer, the method comprising:
   generating a time-based access request including a requested access time by the master device for accessing the slave device;
   receiving and acknowledging the access request by the CAC circuit; and
   controlling the ATC circuit to limit the access permission to the slave device by checking whether the requested access time has expired,
   wherein the system is in a SOC and the CAC checks that the SOC is in a secure state first and then triggers the ATC circuit to record the access request arrival time and the requested access time.

15. The method of claim 14, wherein the CAC circuit controls the ATC circuit to permit a granted time slot to the slave devices if a time counted by the dedicated timer is within a sum of the access request arrive time and the requested access time.

16. The method of claim 15, wherein the CAC circuit controls the ATC circuits to prevent access to the slave device if the time counted by the timer exceeds the sum of the access request arrival time and the requested access time.

* * * * *